(12) United States Patent
Syed et al.

(10) Patent No.: US 12,541,379 B2
(45) Date of Patent: Feb. 3, 2026

(54) DYNAMICALLY GENERATING USER INTERFACES BASED ON MACHINE LEARNING MODELS

(71) Applicant: INTUIT INC., Mountain View, CA (US)

(72) Inventors: Waseem Akram Syed, San Jose, CA (US); Muralidhar Kattimani, San Ramon, CA (US)

(73) Assignee: INTUIT INC., Mountain View, CA (US)

( * ) Notice: Subject to any disclaimer, the term of this patent is extended or adjusted under 35 U.S.C. 154(b) by 177 days.

(21) Appl. No.: 18/499,006

(22) Filed: Oct. 31, 2023

(65) Prior Publication Data

US 2025/0138845 A1    May 1, 2025

(51) Int. Cl.
*G06F 9/451*  (2018.01)
*G06N 20/00*  (2019.01)

(52) U.S. Cl.
CPC ............ *G06F 9/451* (2018.02); *G06N 20/00* (2019.01)

(58) Field of Classification Search
CPC ............ G06F 9/451; G06F 8/38; G06N 20/00
See application file for complete search history.

(56) References Cited

U.S. PATENT DOCUMENTS

| | | | |
|---|---|---|---|
| 11,138,518 B1 * | 10/2021 | Yu | G06F 9/44526 |
| 11,687,544 B2 * | 6/2023 | Kelly | G06F 16/24564 |
| | | | 707/769 |
| 11,893,220 B1 * | 2/2024 | Silverstein | G06F 16/904 |
| 11,900,046 B2 * | 2/2024 | Stenerson | G06F 9/451 |
| 12,020,814 B1 * | 6/2024 | McNair | G16H 50/70 |
| 12,026,599 B1 * | 7/2024 | Lewis, II | G06F 9/451 |
| 2020/0175404 A1 * | 6/2020 | Selvanayagam | G06N 20/00 |
| 2020/0226418 A1 * | 7/2020 | Dorai-Raj | G06F 18/214 |
| 2020/0319872 A1 * | 10/2020 | Yu | H04L 67/34 |
| 2020/0341780 A1 * | 10/2020 | Andolina | G06F 8/38 |
| 2020/0341781 A1 * | 10/2020 | Schoppe | H04L 67/535 |
| 2023/0086778 A1 * | 3/2023 | Wang | G06F 3/0488 |
| | | | 715/763 |
| 2024/0320714 A1 * | 9/2024 | West | G06F 9/453 |
| 2024/0370472 A1 * | 11/2024 | Madisetti | G06F 16/3329 |

FOREIGN PATENT DOCUMENTS

WO   WO-2023230083 A1 * 11/2023 ............. G06N 3/006

* cited by examiner

*Primary Examiner* — Asher D Kells

(74) *Attorney, Agent, or Firm* — Patterson + Sheridan, LLP

(57) ABSTRACT

Certain aspects of the present disclosure provide techniques for rendering visual artifacts in virtual worlds using machine learning models. An example method generally includes identifying, based on a machine learning model and a streaming natural language input, an intent associated with the streaming natural language input; generating, based on the identified intent associated with the streaming natural language input, one or more virtual objects for rendering in a virtual environment displayed on one or more displays of an electronic device; and rendering the generated one or more virtual objects in the virtual environment.

30 Claims, 4 Drawing Sheets

DYNAMICALLY GENERATING USER INTERFACES BASED ON MACHINE LEARNING MODELS

INTRODUCTION

Aspects of the present disclosure relate to user interfaces, and more specifically to dynamically generating user interfaces using machine learning models.

BACKGROUND

In computing systems, a user interacts with applications executing locally or on a remote system via a user interface that displays information to the user or allows the user to input information into these applications. For example, users typically interact with these applications using input devices such as keyboards, mice, touch-screens, or the like, and output is usually provided to users through display devices such as monitors and/or sound devices such as speakers or headphones.

In many cases, software applications may execute using user interfaces defined a priori. For example, user interfaces may be statically defined for different portions of a workflow within a software application or may be statically defined according to a user interface configuration defined by a user of the software application (e.g., in a scenario in which user interfaces are defined as a collection of user-selected subcomponents for displaying and allowing interaction with specific types of data or data from specific sources). These statically defined user interfaces, however, may not adapt to how a user uses a software application and thus may not display information relevant to the user.

Accordingly, improved techniques for generating and rendering user interfaces in software applications are needed.

BRIEF SUMMARY

Certain embodiments provide a computer-implemented method for dynamically generating user interfaces for rendering on a client device. An example method generally includes generating, based on a machine learning model, user contextual information, and an input query, a prioritization score for each component of a plurality of components in a software application, wherein each component is associated with a workflow implemented in the software application; retrieving one or more user interface component definitions based on the input query and the prioritization score for each component of the plurality of components; generating a user interface definition based on the retrieved one or more user interface component definitions and the prioritization score associated with each component of the plurality of components; and outputting, in response to the input query, the user interface definition to a requesting device for rendering within a software application executing on the requesting device.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system compris-ing means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
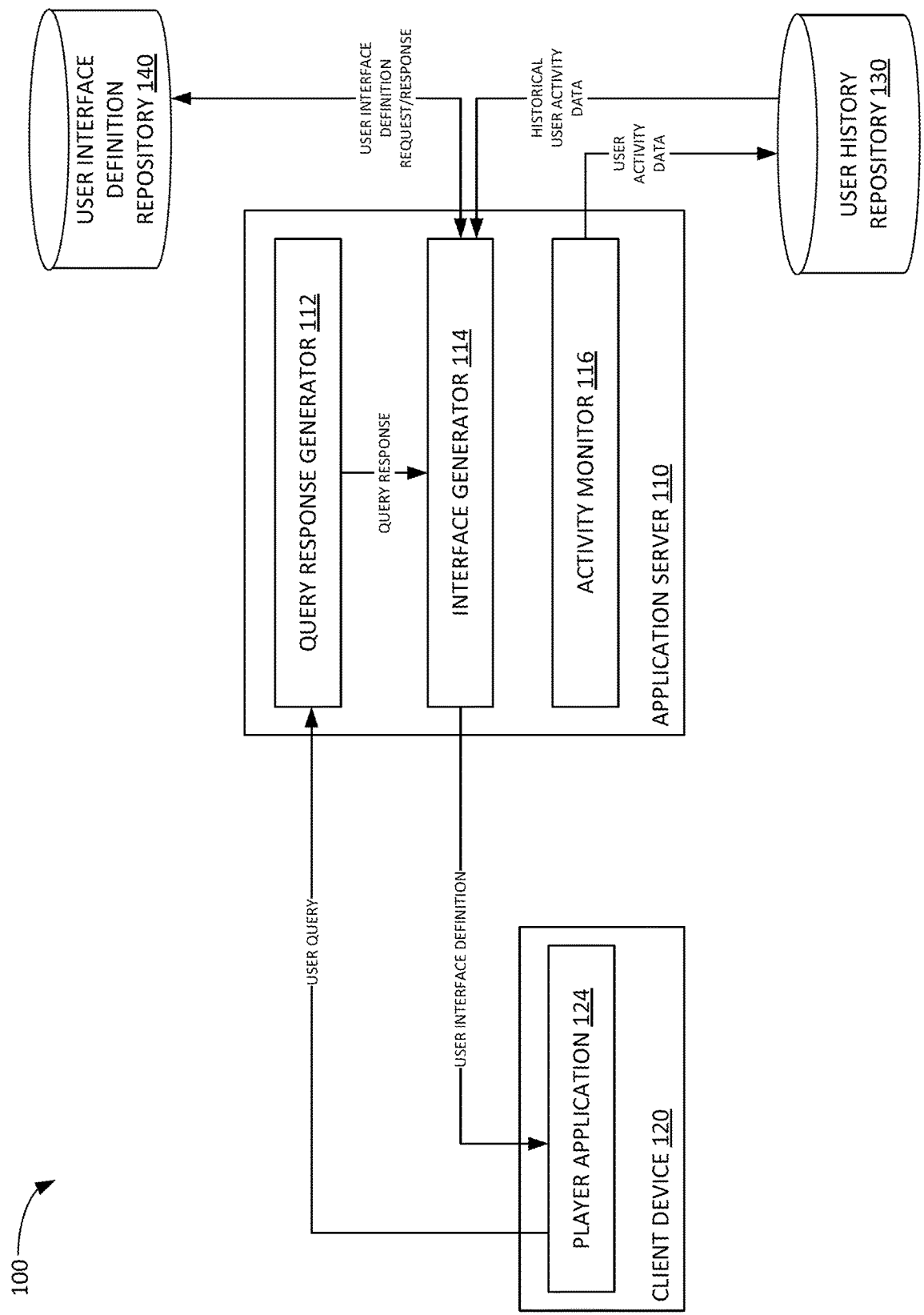
FIG. 1 depicts an example computing environment in which user interfaces are generated using machine learning models, according to embodiments of the present disclosure.

In software applications, user interfaces are rendered to allow a user to view, modify, and otherwise interact with data in the software application. The layout and content included in a user interface may be statically defined by a developer of the software application or defined based on user configuration of user interface components to be displayed in a software application. In a user interface statically defined by the developer of the software application, the user interface may be tightly coupled to the functionality of the software application and may not be modified by a user of the software application. In a user interface defined based on user configuration of the user interface components, the user interface components may be statically defined, and a user interface may be defined as a collection of these statically defined components.

Statically defined user interfaces, however, do not adapt to how different users of a software application use the software application. Thus, these statically defined user interfaces (or user interface components) may display information to a user of the software application that is not relevant to the user, or is at least less relevant than other information. For example, a user interface that is statically defined for displaying sales information to a user may have a defined order in which information is displayed; however, while this order may display relevant information at the top of the user interface to some users, this order may display relevant information at other locations of the user interface to other users. Thus, such existing user interfaces may not make good use of available screen space on display devices used to display such user interfaces.

Embodiments of the present disclosure provide techniques for generating user interfaces using machine learning models. As discussed in further detail herein, user input queries and historical user interaction data may be analyzed using machine learning models. These machine learning models may generate a prioritization score for different components within a software application, and these prioritization scores may be used to select software components to be included in a user interface and the order in which these selected software components are displayed. The resulting user interface definition may then be transmitted to a client device for rendering in a player application executing on the client device. By doing so, aspects of the present disclosure may dynamically generate user interfaces that render relevant information for different users of the software application based on user-specific prioritization of components in the software application. Accordingly, user interfaces described herein make better use of available screen space of a display device on which such a user interface is displayed due to the inclusion of information that is dynamically determined to be most relevant to a particular user and due to the ordering of information for display based on such dynamically determined relevance. Further, because user interfaces may be dynamically generated for different users of a software application, aspects of the present disclosure may reduce the number of requests for new user interfaces generated by a user of the software application, which reduces the amount of computing resources (e.g., messaging bandwidth, power, etc.) consumed in rendering user interfaces and displaying information in a software application relevant to a specific user of the software application.

Example Generating and Rendering of User Interfaces in Software Applications Using Machine Learning Models FIG. 1 illustrates an example computing environment 100 in which user interfaces for a software application are dynamically generated using machine learning models that prioritize components of a software application for a user of the software application. As illustrated, computing environment 100 includes an application server 110, a client device 120, a user history repository 130, and a user interface definition repository 140.

Application server 110 is generally representative of a computing system, such as a server, a cloud compute instance, or the like, which hosts a software application that may be accessed by users of a client device 120 in the computing environment 100. As illustrated, application server 110 includes a query response generator 112, an interface generator 114, and an activity monitor 116.

Generally, the generation of a user interface definition for rendering on the client device 120 may begin with the query response generator 112 receiving an input query from a user of a software application hosted by the application server 110. In some aspects, the input query may be a natural language query which can be parsed by the query response generator in order to identify the specific information that the user is requesting to be displayed in the player application 124 executing on the client device 120. In response, the query response generator 112 can generate an answer to the input query based on user-specific data. In some aspects, the query response generator 112 may use a generative artificial intelligence model to generate a natural language response to the input query. Generally, the generative artificial intelligence model may be trained to generate responses to input queries based on a corpus of software application-specific data, which may result in a generative artificial intelligence model that is trained to generate domain-specific responses to input queries (e.g., responses specific to the software application hosted on the application server 110 and the data contained therein). In some aspects, the generative artificial intelligence model can be trained based on user history data (e.g., from user history repository 130) and other user contextual information (e.g., user geographic location, a category to which the user belongs, etc.) to generate responses to input queries based on previous user activity within a software application (e.g., to generate responses that include information associated with user interface components that the user has frequently interacted with and excluding, or at least minimizing, the inclusion of information associated with user interfaces with which the user has had less frequent interaction). In some aspects, the generative artificial intelligence model may also or alternatively use user data to ground a response generated by the generative artificial intelligence model. In doing so, the generative artificial intelligence model can generate user-specific responses to input queries that include data relevant to a specific user, as opposed to generic responses that include data that may not be relevant to that specific user.

The generated response to the input query generated by query response generator 112 may be provided to interface generator 114 for use in generating a user interface definition that includes data relevant to the user of the software application. A user interface definition may be defined as a collection of declarative constructs that define how a user interface is rendered on a client device. Generally, each component of a software application may be defined according to a defined declarative construct, such as a JavaScript Object Notation (JSON) file. These declarative constructs may include a variety of user interface components, such as buttons, navigation components, image display components, text fields, and the like, which generally translates to a screen or subview rendered in the player application 124 executing on the client device 120. In some aspects, each respective component definition in the software application may be associated with keywords or tags identifying the data with which the respective software component is associated. For example, a declarative construct for an invoicing component in an accounting software application may include objects including tags associating the invoicing component with words like "bill," "check," "charge," "invoice," and other synonyms.

Generally, to generate a user interface definition, the interface generator 114 can parse the generated response to identify different components in the software application to be included in a user interface definition generated for rendering on the player application 124 executing on the client device 120. To identify and select these components for inclusion in a user interface definition, the interface generator can search the user interface definition repository 140 for user interface components associated with specific keywords within the generated response. For example, assume that a response generated by a generative artificial intelligence model deployed to the query response generator 112 includes the words "order," "invoice," "summary," and "share." Each of these words, or a combination thereof, may be associated with components of the software application. In this example, matching components may be associated with the tags (or words) "order summary" from an order component of the software application and "invoice" and "share message" from a billing component of the software application.

In some aspects, the prioritization score may be generated based on a frequency with which specific words associated with different components of the software application are identified in the generated response to the input query. Generally, words that appear with a higher frequency in the generated response may have a higher prioritization score than words that appear with a lower frequency in the generated response. In some aspects, where components of the software application have an equal prioritization score, one of these components may be deemed to have a higher priority. The identification of a component with a higher priority may be performed at random.

In some aspects, interface generator 114 may further use historical user activity data (e.g., from user history repository 130) to determine a prioritization score for the components of the software application to be included in a user interface definition provided to the player application 124. In such a case, a machine learning model trained to predict which user interface components are relevant to a user may ingest historical user activity data to generate prioritization scores for a set of user interface components. The set of user interface components may, in some aspects, be the subset of user interface components identified based on words included in a response to an input query generated by the query response generator 112. In other aspects, the set of user interface components may be a universe of user interface components which can be rendered in the player application 124. The machine learning model may generate predictive scores for each user interface component in the set of user interface components based on the user's previous activity history within the software application and other user contextual information. In some aspects, user interface components may be selected based on the prioritization scores generated by the machine learning model and based on words included in the response to the input query generated by the query response generator 112.

To generate a user interface definition for rendering on the player application 124, the interface generator 114 can order the selected user interface components based on the prioritization scores for each of the user interface components selected for inclusion in the user interface definition. The user interface definition may then be generated based on sequential inclusion of the selected user interface components such that user interface components with higher prioritization scores are rendered at higher priority locations on a screen associated with the client device 120 than user interface components with lower prioritization locations on the screen. Generally, the locations at which higher priority components are rendered on a screen may be defined based on the type of client device 120 on which the player application executes. For example, on a mobile device, the highest priority location at which a user interface component can be rendered may be located at the top of the screen, and lower portions of the screen may be associated with lower priority user interface components. In another example, the highest priority location at which a user interface component can be rendered may be located at a location at which user input is most likely to be received without involving substantial hand movement (e.g., a location at which a thumb would naturally land on a mobile device). In examples in which the client device 120 has a larger screen, such as where the client device 120 is a tablet computer, a desktop or laptop computer connected to an external display, or the like, the highest priority location may be defined as a location on the screen which users naturally begin reading from. For example, for applications deployed in regions in which the natural reading order is left-to-right and top-to-bottom, rendering of user interface components may begin from a defined top-left position and proceed downwards and (optionally) rightwards from this defined top-left position, and vice-versa for applications deployed in regions in which the natural reading order is right-to-left and top-to-bottom. It should be recognized that the foregoing are but examples of how a user interface may be rendered based on prioritization scores associated with user interface components included in a user interface definition, and other rendering orders may be contemplated.

After the user interface definition is generated by the interface generator 114 and deployed (e.g., pushed asynchronously) to the player application 124 for application, activity monitor 116 can monitor and log user activity within the software application (e.g., within the rendered user interface allowing for user interaction with specific components of the software application). Generally, the activity monitor 116 can record information such as the user interface components rendered in response to a query received at the application server 110, interaction with these rendered components, and other information which may provide information about how the user is using the software application, and commit this user activity data to the user history repository 130. As discussed, this user activity history in the user history repository 130 may be used, in some aspects, to train or refine a machine learning model used to generate responses to input queries and/or to generate prioritization scores for user interface components within a software application so that the software application continually learns to generate user interfaces that display relevant information to a user of the software application.

For example, the machine learning model (e.g., generative AI model) may be trained through a supervised learning process that involves providing training inputs (e.g., input queries and/or user contextual information) as inputs to machine learning model. The machine learning model processes the training inputs and outputs predictions (e.g., responses to the input queries and/or prioritization scores for user interface components) based on the training inputs. The predictions are compared to the known labels associated with the training inputs (e.g., the labels may be generated based on user input and/or activity data) to determine the accuracy of the machine learning model, and parameters of machine learning model are iteratively adjusted until one or more conditions are met. For instance, the one or more conditions may relate to an objective function (e.g., a cost function or loss function) for optimizing one or more variables (e.g., model accuracy, model precision, model recall, and/or the like). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for a machine learning model, such as based on validation data and test data, as is known in the art.

Figure 2:
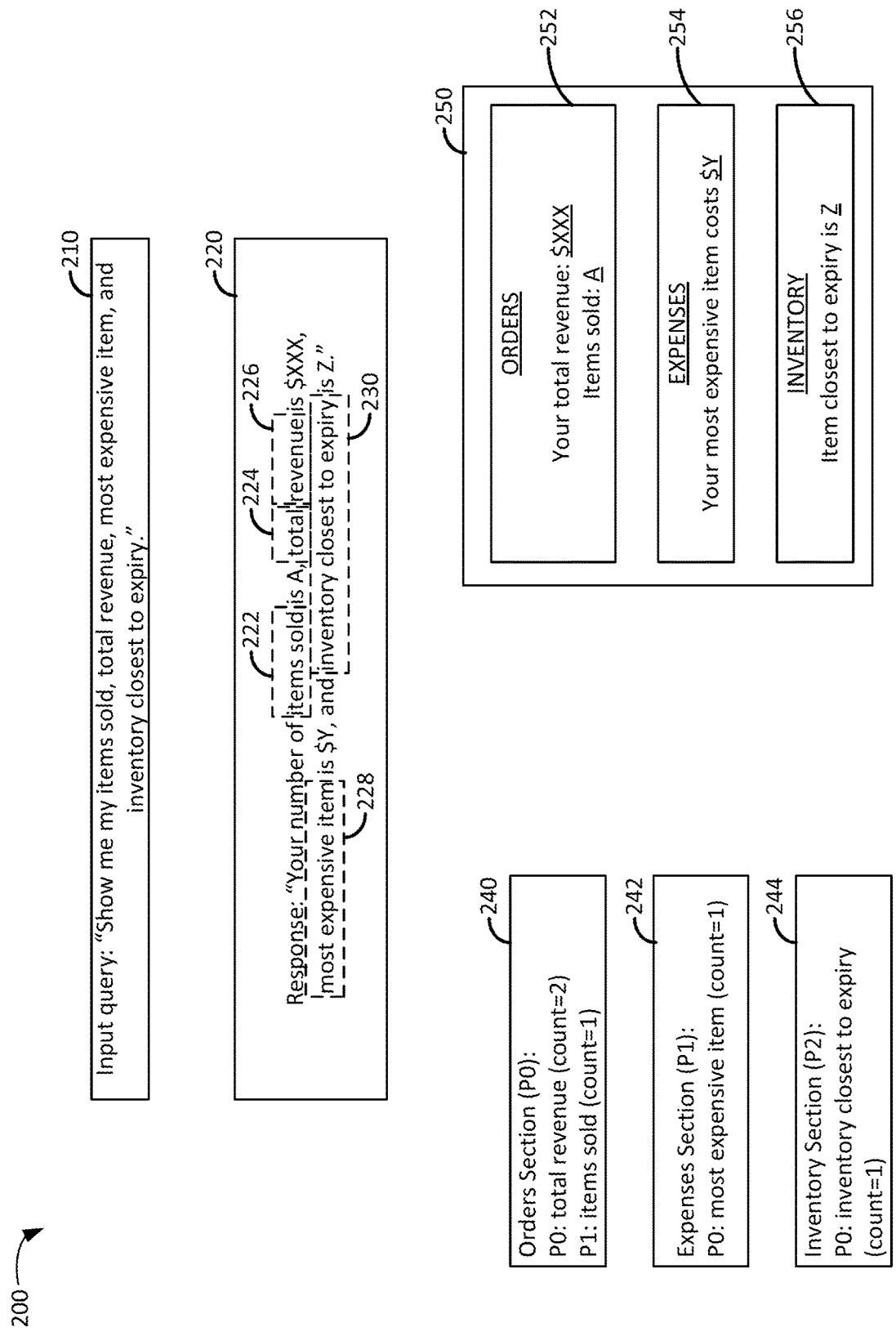
FIG. 2 illustrates an example of generating a user interface using machine learning models, according to embodiments of the present disclosure.

FIG. 2 illustrates an example 200 of generating a user interface using machine learning models, according to embodiments of the present disclosure.

As illustrated, to prompt the generation of a user interface using machine learning models that prioritize the placement of relevant information for a user of a software application, an input query 210 may be received for processing. In this example the input query 210 is a natural language query requesting specific information from a software application. For example, as illustrated, the input query 210 requests that an application display the following to the user of the software application in a user interface 250 rendered on a client device: (1) the items sold, (2) total revenue from these sales, (3) the most expensive item in inventory, and (4) the inventory items that are closest to expiry. Items (1) and (2) may be clustered in an order information section of the software application, item (3) may be included in an expenses section, and item (4) may be included in an inventory section.

In response, a generative artificial intelligence model (e.g., deployed as part of a query response generator, such as the query response generator 112 illustrated in FIG. 1), can generate a natural language response 220 to the input query 210. In this example, the natural language response 220 includes a plurality of words or groups of words which are associated with different components in the software application (e.g., as tags associated with these components) and which can be used, at least in part, to determine the prioritization of user interface components in a user interface rendered in response to the input query 210. As illustrated, the words may include tags 222, 224, 226, 228, and 230. Tag 222 corresponds to a user interface component for the number of items sold; tags 224 and 226 correspond to a user interface component for revenue, tag 228 corresponds to a user interface component for the most expensive item, and tag 230 corresponds to a user interface component for the item closest to expiry.

Using the count associated with each user interface element, a user interface generator (e.g., the interface generator 114 illustrated in FIG. 1) can generate a prioritization order for user interface components associated with each section to be rendered in the user interface. In this example, the prioritization order may be determined (e.g., based on past user interaction history with these sections in the software application) to include the orders section 240 at rank P0 (highest priority), the expenses section 242 at rank P1, and the inventory section 244 at rank P2. Within the orders section 240, the count of the number of times a word in the natural language response 220 to the input query 210 is maintained. In this example, the number of times words associated with a total revenue user interface component appeared in the natural language response 220 is 2, while the number of times words associated with an items sold user interface component appeared in the natural language response 220 is 1. Thus, the total revenue user interface component may have a rank of P0 in the orders section 240, and the items sold user interface component may have a rank of P1. This process of counting a number of times words in a natural language response 220 match words associated with user interface components may be repeated for the expenses section 242 and the inventory section 244.

Based on the prioritization order determined for the orders section 240, the expenses section 242, and the inventory section 244, a user interface generator can generate a user interface 250 with user interface components 252, 254, and 256 corresponding to the orders section 240, the expenses section 242, and the inventory section 244, respectively. Within these user interface components, the information displayed therein, and the associated user interface components, may be ordered according to the rankings determined for these user interface components, as discussed above. Generally, the order and location in which the user interface components 252, 254, and 256 appear may be determined based on the prioritization assigned to each of these sections and the device on which the user interface 250 is rendered. In this example, where the user interface 250 is rendered on a mobile device, such as a mobile phone, the display area available for rendering a user interface may restrict the user interface to a single column. Thus, higher priority user interface components may be rendered at the top of the user interface 250, and lower priority user interface components may be rendered at lower locations in the user interface 250. It should be understood, however, that other priority-based orderings of user interface components other than a top-to-bottom ordering of user interface components may be contemplated, based on information such as the size and resolution of a display on which the user interface is to be generated and/or other contextual information about the device(s) on which the user interface will be generated.

Figure 3:
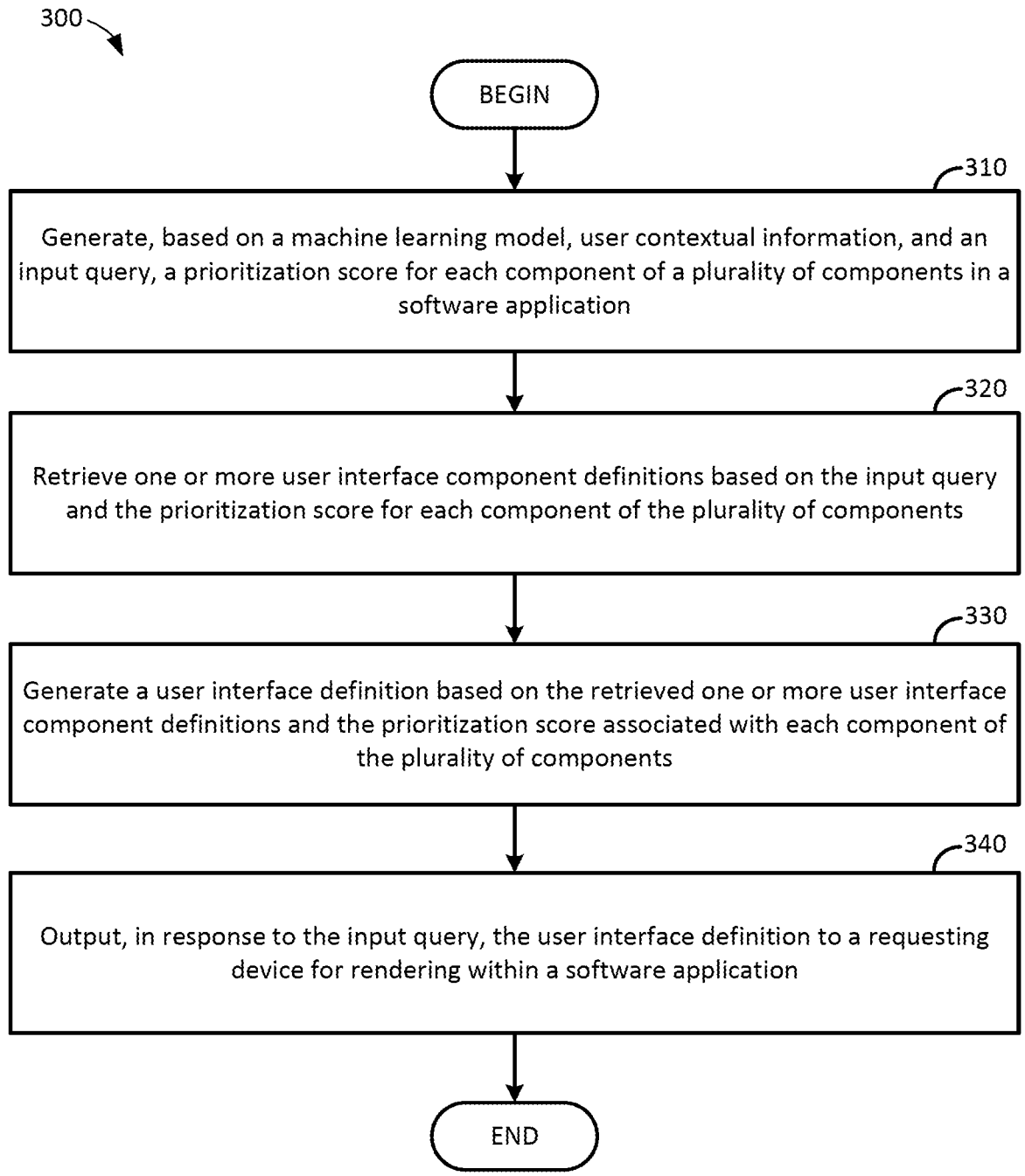
FIG. 3 illustrates example operations for generating a user interface using machine learning models, according to embodiments of the present disclosure.

Example Methods for Generating and Rendering of User Interfaces in Software Applications Using Machine Learning Models FIG. 3 illustrates example operations 300 that may be performed to generate and render user interfaces in software applications using machine learning models, according to embodiments of the present disclosure. Operations 300 may be performed by any computing device which can use one or more machine learning models to generate responses to input queries and generate user interface definitions for rendering on an electronic display via a player application based on the generated responses, such as application server 110 illustrated in FIG. 1.

As illustrated, the operations 300 begin at block 310 with generating, based on a machine learning model, user contextual information, and an input query, a prioritization score for each component of a plurality of components in a software application. Generally, each component may be associated with a workflow implemented in the software application.

In some aspects, the user contextual information includes user activity history with respect to the plurality of components in the software application. As discussed, the user activity history, which may identify which user interface components have previously been provided to the user in response to previous queries, user interaction with user interface components or different workflows within the software application, or the like. In some aspects, the user activity history may influence the prioritization scores generated for each user interface component, with user interface components with which the user has more frequently interacted having higher prioritization scores than user interface components with which the user has less frequently interacted. In some aspects, the machine learning model may use the user activity history, in conjunction with the input query, to assign prioritization scores to each user interface component of a plurality of user interface components, with higher prioritization scores identifying user interface components with which the user is more likely to interact (and which are more likely to provide useful information to the user of the software application in the context of the user's activity history and the input query) and lower prioritization scores identifying user interface components with which the user is less likely to interact.

At block 320, the operations 300 proceed with retrieving one or more user interface component definitions based on the input query and the prioritization score for each component of the plurality of components.

In some aspects, retrieving the one or more user interface component definitions may include retrieving user interface component definitions for components in the software application having prioritization scores above a threshold rank. These user interface components for which component definitions are retrieved may be components that have a highest likelihood of providing usable information to the user of the software application in response to the input query. In some aspects, the threshold rank may be defined a priori as a minimum prioritization score. In some aspects, the threshold rank may be defined as a maximum number of components which can be included in a user interface definition generated in response to an input query.

In some aspects, the user interface components may include definitions of user interface objects associated with one or more keywords. In such a case, retrieving the one or more user interface component definitions may include, for each component, identifying one or more objects of the user interface objects based on matching keywords included in the response to the input query.

At block 330, the operations 300 proceed with generating a user interface definition based on the retrieved one or more user interface component definitions and the prioritization score associated with each component of the plurality of components.

In some aspects, generating the user interface definition includes generating an ordered list of components from the one or more components based on the prioritization score associated with each component of the one or more components. For each component in the one or more components, user interface component definitions associated with one or more of requested data identified in the input query are inserted into the user interface definition. In some aspects, generating the ordered list of components comprises generating a random order of components having a same prioritization score. For example, as discussed above, where two components have a same prioritization score, one of these components may be deemed to have a higher prioritization score (and thus appear in a higher priority location when rendered on a screen by a software application on the requesting device) than the other one of these components.

In some aspects, the user interface definition is generated further based on a type of device on which the software application executes. For example, the user interface definition, which may be a structured text file or other declarative definition of a user interface, may be generated differently for different types of devices to account for device properties such as screen size, screen orientation, and the like. In some aspects, the user interface definition may also or alternatively be generated based on various localization properties associated with the environment in which the device operates. For example, in geographic regions where the natural order of reading text is left-to-right and top-to-bottom, higher priority information (and the corresponding user interface components) may be located at the upper-left side of the screen, and lower priority information may be located on the right side of the screen and/or below higher priority information.

At block 340, the operations 300 proceed with outputting, in response to the input query, the user interface definition to a requesting device for rendering within a software application executing on the requesting device.

In some aspects, outputting the user interface definition comprises pushing the user interface definition to a client device on which the software application executes asynchronously.

In some aspects, the operations 300 may further include generating, using a generative artificial intelligence model, a response to the input query, wherein the prioritization score is generated based further on the response to the input query. The input query may include a natural language query requesting information associated with one or more components of the software application, and the response may include a natural language response including the requested information. As discussed above, in some aspects, the prioritization scores for the user interface components in the software application may be generated based on a frequency with which keywords associated with these user interface components appear. Generally, components having a higher frequency of matching tags or other words in the generated response may have higher prioritization scores than components having a lower frequency of matching tags or other words in the generated response.

In some aspects, the operations 300 further include receiving interaction data for the user interface definition from a client device on which the software application executes. The machine learning model may be refined (e.g., retrained) based on the received interaction data. The refined (e.g., retrained) machine learning model may then be used to determine subsequent user interface definitions with increased accuracy. In this way, the machine learning model may be continuously improved in an interactive feedback loop by which interaction data for user interface definitions determined based on outputs from the machine learning model is used as "ground truth" data for generating updated labeled training data for the machine learning model.

Figure 4:
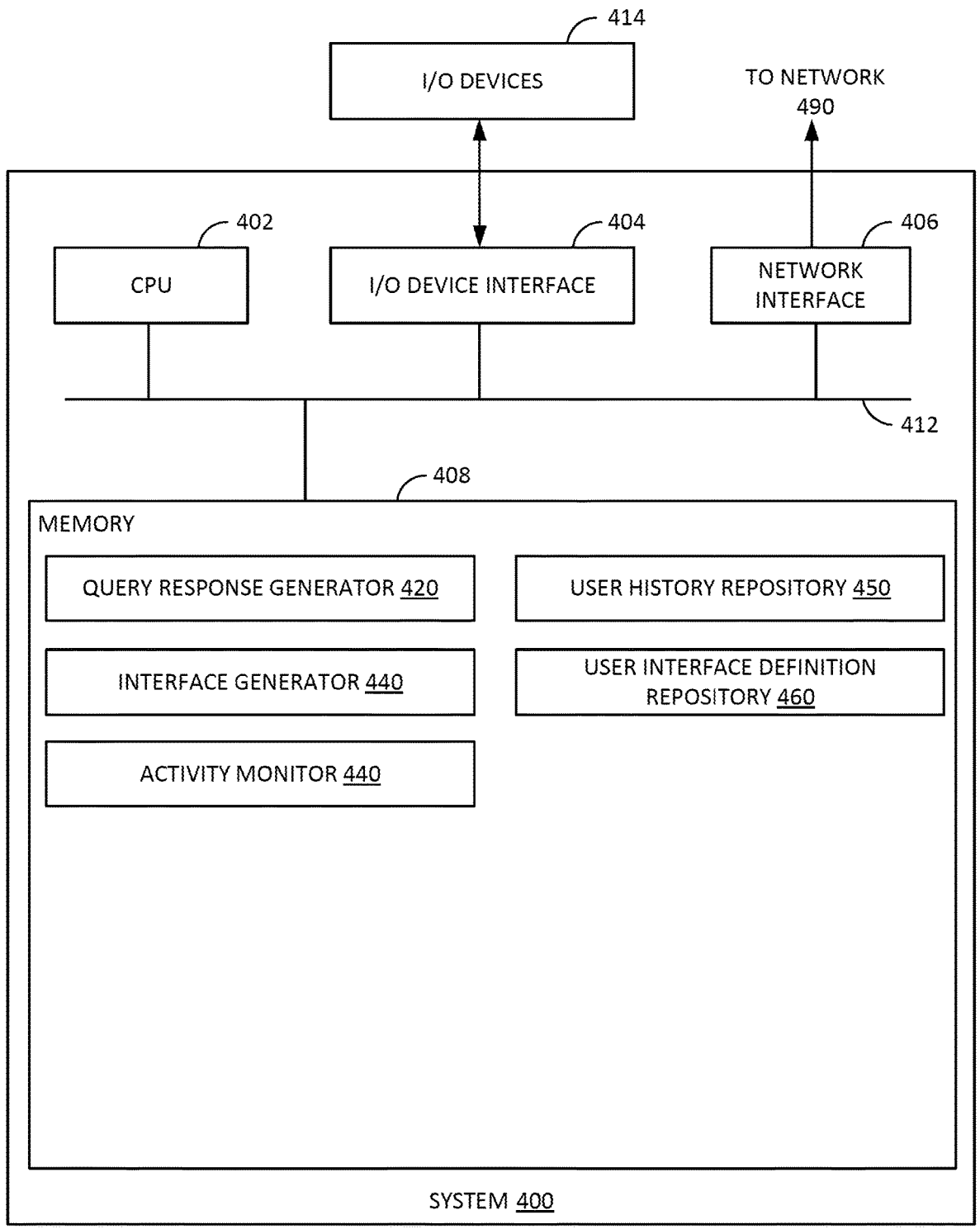
FIG. 4 illustrates an example system on which embodiments of the present disclosure can be performed.

Example System for Generating and Rendering
User Interfaces in Software Applications Using
Machine Learning Models FIG. 4 illustrates an example system 400 in which user interface definitions are generated in response to receipt of an input query for data from a software application using machine learning models. System 400 may correspond to the application server 110 illustrated in FIG. 1. In some aspects, system 400 may perform the methods as described with respect to FIG. 2.

As shown, system 400 includes a central processing unit (CPU) 402, one or more I/O device interfaces 404 that may allow for the connection of various I/O devices 414 (e.g., keyboards, displays, mouse devices, pen input, etc.) to the system 400, network interface 406 through which system 400 is connected to network 490 (which may be a local network, an intranet, the internet, or any other group of computing devices communicatively connected to each other), a memory 408, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, and memory 408.

CPU 402 is included to be representative of a single CPU, multiple CPUs, a single CPU having multiple processing cores, and the like.

Memory 408 is representative of a volatile memory, such as a random access memory, or a nonvolatile memory, such as nonvolatile random access memory, phase change random access memory, or the like. As shown, memory 408 includes a query response generator 420, an interface generator 430, an activity monitor 440, a user history repository 450, and a user interface definition repository 440.

The query response generator 420 generally corresponds to the query response generator 112 illustrated in FIG. 1. Generally, the query response generator receives an input query from a client device (e.g., via network interface 406) and generates a response to the input query using a generative artificial intelligence model. Generally, the response generated by the generative artificial intelligence model may be grounded based on user-specific data in the software application and user contextual information, such as user activity history data (e.g., from user history repository 450 and/or other user activity data used to train the generative artificial intelligence model). The generated response may be natural language response generated in response to a natural language query.

The interface generator 430 generally corresponds to the interface generator 114 illustrated in FIG. 1. Generally, the interface generator 430 generates a prioritization score for components of a software application based on the response to the input query generated by the query response generator 420. The prioritization score may be generated, for example, based on a frequency with which words or other tags associated with a user interface component are included in the generated response. Based on the prioritization scores generated for each user interface component in a software application, the interface generator 430 generates a user interface definition including one or more definitions retrieved from the user interface definition repository 460 (corresponding to the user interface definition repository 140 illustrated in FIG. 1) organized such that user interface components with higher prioritization scores are included in higher-priority locations when rendered on a display of a client device from which the input query was received and user interface components with lower prioritization scores are included in lower-priority locations. In some aspects, the interface generator 430 may use a machine learning model to generate prioritization scores for the user interface components based on the generated response and the user activity history data (e.g., from user history repository 450, which may correspond to the user history repository 130 illustrated in FIG. 1). The interface generator 430 can output the generated user interface definition to the client device (e.g., via network interface 406) for rendering on the client device or an electronic device communicatively coupled thereto.

The activity monitor 440 generally corresponds to the activity monitor 116 illustrated in FIG. 1. Generally, the activity monitor 440 monitors user interaction with components of the software application presented to a user of the software application through a generated user interface definition. The monitored user interaction and other user activity may be used (e.g., by the activity monitor 440 or an external model training system) to retrain, or refine, one or more machine learning models used to generate responses to input queries and determine which user interface components are to be included in a user interface definition returned in response to an input query (e.g., the generative artificial intelligence model used by query response generator 420 to generate a response to an input query, amongst others).

Note that FIG. 4 is just one example of a system, and other systems including fewer, additional, or alternative components are possible consistent with this disclosure.

Example Clauses

Implementation examples are described in the following numbered clauses:

Clause 1: A method, comprising: generating, based on a machine learning model, user contextual information, and an input query, a prioritization score for each component of a plurality of components in a software application, wherein each component is associated with a workflow implemented in the software application; retrieving one or more user interface component definitions based on the input query and the prioritization score for each component of the plurality of components; generating a user interface definition based on the retrieved one or more user interface component definitions and the prioritization score associated with each component of the plurality of components; and outputting, in response to the input query, the user interface definition to a requesting device for rendering within a software application executing on the requesting device.

Clause 2: The method of Clause 1, wherein the user contextual information comprises user activity history with respect to the plurality of components in the software application.

Clause 3: The method of any of Clauses 1 or 2, wherein retrieving the one or more user interface component definitions comprises retrieving user interface component definitions for components in the software application having prioritization scores above a threshold rank.

Clause 4: The method of any of Clauses 1 through 3, wherein the user interface component definitions comprise definitions of user interface objects associated with one or more keywords.

Clause 5: The method of Clause 4, wherein retrieving the one or more user interface component definitions, comprises for each component, identifying one or more objects of the user interface objects based on matching keywords included in the response to the input query.

Clause 6: The method of any of Clauses 1 through 5, further comprising generating, using a generative artificial intelligence model, a response to the input query, wherein the prioritization score is generated based further on the response to the input query.

Clause 7: The method of Clause 6, wherein: the input query comprises a natural language query requesting information associated with one or more components of the software application, and the response comprises a natural language response including the requested information.

Clause 8: The method of any of Clauses 1 through 7, wherein generating the user interface definition comprises: generating an ordered list of components from the one or more components based on the prioritization score associated with each component of the one or more components; and for each component in the one or more components, inserting user interface component definitions associated with one or more of requested data identified in the input query.

Clause 9: The method of Clause 8, wherein generating the ordered list of components comprises generating a random order of components having a same prioritization score.

Clause 10: The method of any of Clauses 1 through 9, wherein the user interface definition is generated further based on a type of device on which the software application executes.

Clause 11: The method of any of Clauses 1 through 10, further comprising: receiving interaction data for the user interface definition from a client device on which the software application executes; and refining the machine learning model based on the received interaction data.

Clause 12: The method of any of Clauses 1 through 11, wherein outputting the user interface definition comprises pushing the user interface definition to a client device on which the software application executes asynchronously.

Clause 13: A system, comprising: a memory having executable instructions stored thereon; and a processor configured to execute the executable instructions to perform the methods of any one of Clauses 1 through 12.

Clause 14: A system, comprising: means for performing the methods of any one of Clauses 1 through 12.

Clause 15: A computer-readable medium having instructions stored thereon which, when executed by a processor, performs the methods of any one of Clauses 1 through 12.

ADDITIONAL CONSIDERATIONS

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    generating, based on a machine learning model, user contextual information, and an input query, a prioritization score for each component of a plurality of components in a software application, wherein each component is associated with a workflow implemented in the software application, wherein the prioritization score is generated based on a response to the input query that is generated using a generative machine learning model;
    retrieving one or more user interface component definitions based on the input query and the prioritization score for each component of the plurality of components;
    generating a user interface definition based on the retrieved one or more user interface component definitions and the prioritization score associated with each component of the plurality of components; and
    outputting, in response to the input query, the user interface definition to a requesting device for rendering within a software application executing on the requesting device.

2. The method of claim 1, wherein the user contextual information comprises user activity history with respect to the plurality of components in the software application.

3. The method of claim 1, wherein retrieving the one or more user interface component definitions comprises retrieving user interface component definitions for components in the software application having prioritization scores above a threshold rank.

4. The method of claim 1, wherein the user interface component definitions comprise definitions of user interface objects associated with one or more keywords.

5. The method of claim 4, wherein retrieving the one or more user interface component definitions, comprises for each component, identifying one or more objects of the user interface objects based on matching keywords included in the response to the input query.

6. The method of claim 1, wherein:
    the input query comprises a natural language query requesting information associated with one or more components of the software application, and
    the response comprises a natural language response including the requested information.

7. The method of claim 1, wherein generating the user interface definition comprises:
    generating an ordered list of components from the one or more components based on the prioritization score associated with each component of the one or more components; and
    for each component in the one or more components, inserting user interface component definitions associated with one or more of requested data identified in the input query.

8. The method of claim 7, wherein generating the ordered list of components comprises generating a random order of components having a same prioritization score.

9. The method of claim 1, wherein the user interface definition is generated further based on a type of device on which the software application executes.

10. The method of claim 1, further comprising:
    receiving interaction data for the user interface definition from a client device on which the software application executes; and
    refining the machine learning model based on the received interaction data.

11. The method of claim 1, wherein outputting the user interface definition comprises pushing the user interface definition to a client device on which the software application executes asynchronously.

12. A processing system, comprising:
    a memory having executable instructions stored thereon; and
    one or more processors configured to execute the executable instructions in order to cause the processing system to:
        generate, based on a machine learning model, user contextual information, and an input query, a prioritization score for each component of a plurality of components in a software application, wherein each component is associated with a workflow implemented in the software application, wherein the prioritization score is generated based on a response to the input query that is generated using a generative machine learning model;
        retrieve one or more user interface component definitions based on the input query and the prioritization score for each component of the plurality of components;
        generate a user interface definition based on the retrieved one or more user interface component definitions and the prioritization score associated with each component of the plurality of components; and output, in response to the input query, the user interface definition to a requesting device for rendering within a software application executing on the requesting device.

13. The processing system of claim 12, wherein to retrieve the one or more user interface component definitions, the one or more processors are configured to cause the processing system to retrieve user interface component definitions for components in the software application having prioritization scores above a threshold rank.

14. The processing system of claim 12, wherein:
the user interface component definitions comprise definitions of user interface objects associated with one or more keywords, and
to retrieve the one or more user interface component definitions, the one or more processors are configured to cause the processing system to identify, for each component, one or more objects of the user interface objects based on matching keywords included in the response to the input query.

15. The processing system of claim 12, wherein to generate the user interface definition, the one or more processors are configured to cause the processing system to:
generate an ordered list of components from the one or more components based on the prioritization score associated with each component of the one or more components; and
for each component in the one or more components, insert user interface component definitions associated with one or more of requested data identified in the input query.

16. The processing system of claim 12, wherein the user interface definition is generated further based on a type of device on which the software application executes.

17. The processing system of claim 12, wherein the one or more processors are further configured to cause the processing system to:
receive interaction data for the user interface definition from a client device on which the software application executes; and
refine the machine learning model based on the received interaction data.

18. The processing system of claim 12, wherein to output the user interface definition, the one or more processors are configured to cause the processing system to push the user interface definition to a client device on which the software application executes asynchronously.

19. A method, comprising:
generating, based on a machine learning model, user contextual information, and an input query, a prioritization score for each component of a plurality of components in a software application, wherein each component is associated with a workflow implemented in the software application;
retrieving one or more user interface component definitions based on the input query and the prioritization score for each component of the plurality of components;
generating a user interface definition based on the retrieved one or more user interface component definitions and the prioritization score associated with each component of the plurality of components, wherein generating the user interface definition comprises:
generating an ordered list of components from the one or more components based on the prioritization score associated with each component of the one or more components, wherein generating the ordered list of components comprises generating a random order of components having a same prioritization score; and
for each component in the one or more components, inserting user interface component definitions associated with one or more of requested data identified in the input query; and
outputting, in response to the input query, the user interface definition to a requesting device for rendering within a software application executing on the requesting device.

20. The method of claim 19, wherein retrieving the one or more user interface component definitions comprises retrieving user interface component definitions for components in the software application having prioritization scores above a threshold rank.

21. The method of claim 19, wherein:
the user interface component definitions comprise definitions of user interface objects associated with one or more keywords, and
retrieving the one or more user interface component definitions, comprises for each component, identifying one or more objects of the user interface objects based on matching keywords included in the response to the input query.

22. The method of claim 19, further comprising generating, using a generative artificial intelligence model, a response to the input query, wherein the prioritization score is generated based further on the response to the input query.

23. The method of claim 19, wherein the user interface definition is generated further based on a type of device on which the software application executes.

24. The method of claim 19, further comprising:
receiving interaction data for the user interface definition from a client device on which the software application executes; and
refining the machine learning model based on the received interaction data.

25. A processing system, comprising:
a memory having executable instructions stored thereon; and
one or more processors configured to execute the executable instructions in order to cause the processing system to:
generate, based on a machine learning model, user contextual information, and an input query, a prioritization score for each component of a plurality of components in a software application, wherein each component is associated with a workflow implemented in the software application;
retrieve one or more user interface component definitions based on the input query and the prioritization score for each component of the plurality of components;
generate a user interface definition based on the retrieved one or more user interface component definitions and the prioritization score associated with each component of the plurality of components, wherein generating the user interface definition comprises:
generating an ordered list of components from the one or more components based on the prioritization score associated with each component of the one or more components, wherein generating the ordered list of components comprises generating a random order of components having a same prioritization score; and for each component in the one or more components, inserting user interface component definitions associated with one or more of requested data identified in the input query; and output, in response to the input query, the user interface definition to a requesting device for rendering within a software application executing on the requesting device.

26. The processing system of claim 25, wherein to retrieve the one or more user interface component definitions, the one or more processors are configured to cause the processing system to retrieve user interface component definitions for components in the software application having prioritization scores above a threshold rank.

27. The processing system of claim 25, wherein:

the user interface component definitions comprise definitions of user interface objects associated with one or more keywords, and to retrieve the one or more user interface component definitions, the one or more processors are configured to cause the processing system to identify, for each component, one or more objects of the user interface objects based on matching keywords included in the response to the input query.

28. The processing system of claim 25, wherein the one or more processors are further configured to cause the processing system to generate, using a generative artificial intelligence model, a response to the input query, wherein the prioritization score is generated based further on the response to the input query.

29. The processing system of claim 25, wherein the one or more processors are further configured to cause the processing system to:

receive interaction data for the user interface definition from a client device on which the software application executes; and refine the machine learning model based on the received interaction data.

30. The processing system of claim 25, wherein to output the user interface definition, the one or more processors are configured to cause the processing system to push the user interface definition to a client device on which the software application executes asynchronously.

* * * * *